US012573859B2

(12) United States Patent
    Kono

(10) Patent No.: US 12,573,859 B2
(45) Date of Patent: Mar. 10, 2026

(54) BATTERY PACK, SYSTEM, OPERATION STATUS TRANSMISSION METHOD AND PROGRAM

(71) Applicant: YAMABIKO CORPORATION, Tokyo (JP)

(72) Inventor: Toru Kono, Ohme (JP)

(73) Assignee: YAMABIKO CORPORATION (JP)

( * ) Notice: Subject to any disclaimer, the term of this patent is extended or adjusted under 35 U.S.C. 154(b) by 297 days.

(21) Appl. No.: 17/237,103

(22) Filed: Apr. 22, 2021

(65) Prior Publication Data

US 2021/0376624 A1    Dec. 2, 2021

(30) Foreign Application Priority Data

Jun. 2, 2020    (JP) ................................. 2020-096282

(51) Int. Cl.
    *H02J 7/00*          (2026.01)
(52) U.S. Cl.
    CPC ............ *H02J 7/0029* (2013.01); *H02J 7/005* (2020.01); *H02J 7/0063* (2013.01); *H02J 7/00712* (2020.01)
(58) Field of Classification Search
    CPC ...... H02J 7/0029; H02J 7/005; H02J 7/00712; H02J 7/0063
    See application file for complete search history.

(56) References Cited

U.S. PATENT DOCUMENTS

| | | | |
|---|---|---|---|
| 7,495,416 B2 | 2/2009 | Sato et al. | |
| 2009/0039833 A1* | 2/2009 | Kitagawa | .............. H01M 10/48 |
| | | | 320/134 |
| 2009/0079382 A1* | 3/2009 | Norimatsu | ........ H01M 8/04246 |
| | | | 320/167 |
| 2014/0334270 A1* | 11/2014 | Kusakawa | .............. B25B 21/00 |
| | | | 368/9 |
| 2018/0196394 A1 | 7/2018 | Kusakawa | |

FOREIGN PATENT DOCUMENTS

JP          H06-153409 A      5/1994

OTHER PUBLICATIONS

Extended European Search Report issued for the corresponding European Application No. 21169560.6; dated Oct. 7, 2021 (total 8 pages).

* cited by examiner

*Primary Examiner* — Julian D Huffman
*Assistant Examiner* — Sadia Kousar
(74) *Attorney, Agent, or Firm* — Harness, Dickey & Pierce, P.L.C.

(57)          ABSTRACT

A battery pack is provided that supplies power to a device to be connected, comprising: a power output circuit configured to output a first power when an operation status of the battery pack is normal, and to output a second power when an operation status of the battery pack is abnormal, wherein: the first power is power for operating the device, and the second power is power having a magnitude that the device does not operate.

10 Claims, 5 Drawing Sheets

BATTERY PROTECTION CIRCUIT

31 — JUDGMENT UNIT

32 — SIGNAL COMMUNICATION UNIT

33 — POWER MEASUREMENT UNIT

34 — RECEPTION UNIT

35 — HISTORY STORAGE UNIT

36 — HISTORY COMMUNICATION UNIT

3

BATTERY PACK, SYSTEM, OPERATION STATUS TRANSMISSION METHOD AND PROGRAM

CROSS REFERENCE TO RELATED APPLICATIONS

The present application claims priority under 35 U.S.C. § 119 to Japanese Patent Application No. 2020-96282, filed Jun. 2, 2020.

BACKGROUND

Technical Field

The present invention relates to a battery pack, a system, an operation status transmission method, and a program.

Background Art

There are many methods as communication methods when the operation of a battery pack is abnormal, such as communication using a dedicated signal line.

Japan Unexamined Patent Publication No. H06-153409 discloses a technique of transmitting an electric signal at the time of abnormal operation of a battery pack via a power supply line at the time of power supply.

However, in the communication method disclosed in Japan Unexamined Patent Publication No. H06-153409, it is necessary to determine the compatibility between the battery pack and the connected device before use.

The present invention provides a battery pack that supplies power to a device to be connected, comprising: a power output circuit configured to output a first power when an operation status of the battery pack is normal, and to output a second power when an operation status of the battery pack is abnormal, wherein: the first power is power for operating the device, and the second power is power having a magnitude that the device does not operate.

According to such a battery pack, it is unnecessary to determine the compatibility between a battery pack and a connected device, thus the connected device can be operated independently of a specific battery pack.

DETAILED DESCRIPTION OF EMBODIMENTS

Hereinafter, an embodiment of the present invention will be described with reference to the drawings. Various features described in the embodiment below can be combined with each other.

It should be noted that a program for realizing a software in the present embodiment may be provided as non-transitory computer readable medium that can be read by a computer, may be provided for download from an external server, or may be provided so as to start the program on an external computer and realize the function thereon (so-called cloud computing).

Further, in the present embodiment, the "unit" may include, for example, a combination of hardware resources implemented by a circuit in a broad sense and information processing of software that can be concretely realized by these hardware resources. In addition, various information is handled in this embodiment, and these information are, for example, physical values of signal values representing voltage and current, high/low signal values as a bit aggregate of a binary number composed of 0 or 1, or quantum superposition (so-called qubit), and communication/calculation can be executed on a circuit in a broad sense.

Further, a circuit in a broad sense is a circuit realized by at least appropriately combining a circuit, a circuitry, a processor, a memory, and the like. That is, an application special integrated circuit (ASIC), a programmable logic device (for example, a simple programmable logic device (SPLD)), a complex programmable logic device (CLPD), a field programmable gate array (FPGA), and the like.

1. Overall Configuration

Figure 1:
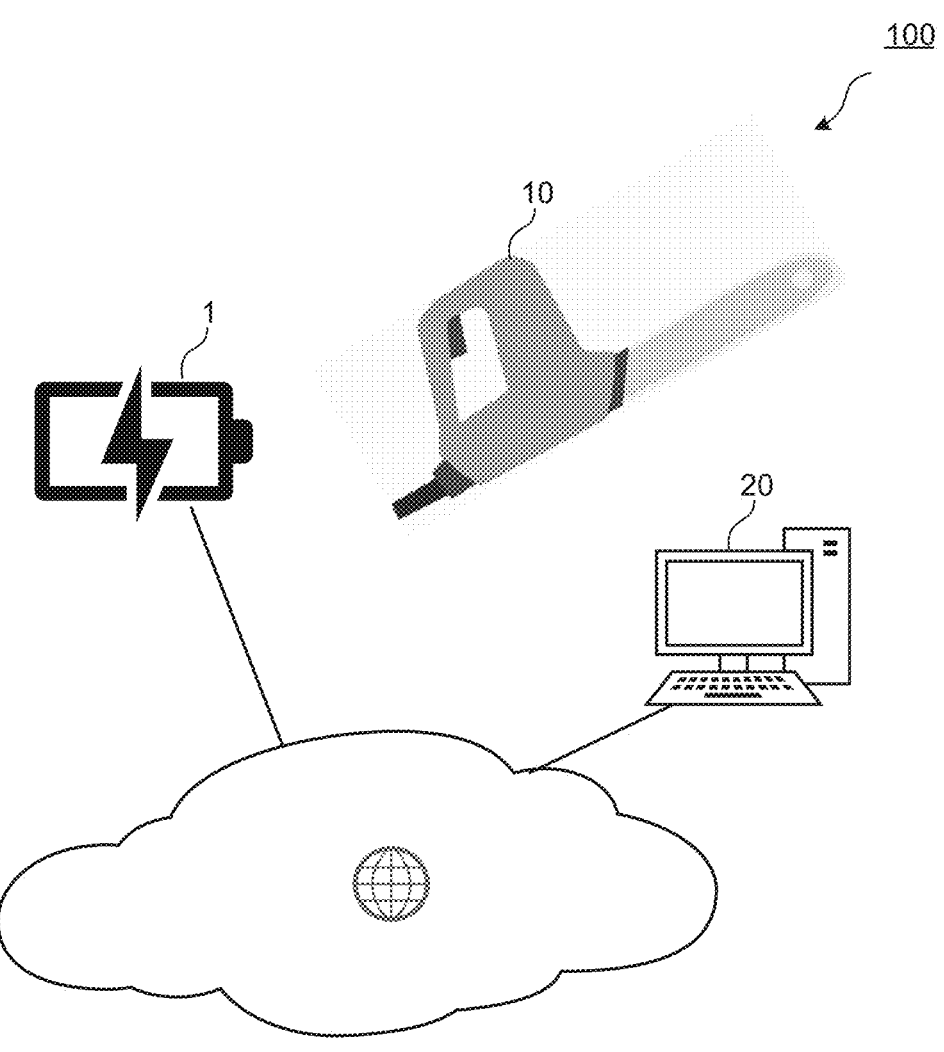
FIG. 1 is a schematic view of a system 100 comprising a battery pack 1 and a device 10 to be connected.

In chapter 1, the hardware configuration according to the present embodiment will be described. FIG. 1 is a schematic view of a system 100 comprising a battery pack 1 and a device 10 to be connected. As shown in FIG. 1, the system 100 comprises a battery pack 1 and a device 10 to be connected. In the present embodiment, the battery pack 1 supplies power to the device 10 to be connected. The battery pack 1 is configured to supply a first power D1 and a second power D2 to the device 10 through a first connection terminal T1 of the battery pack 1 and a second connection terminal T2 of the device 10. As a result, the device 10 is configured to operate based on the first power D1 and to be controlled based on the second power D2. The system 100 may further comprise an information processing device 20 as shown in FIG. 1. The information processing device 20 can acquire information related to operation status of the battery pack 1 through a telecommunication line.

1.1 Battery Pack 1

Figure 2:
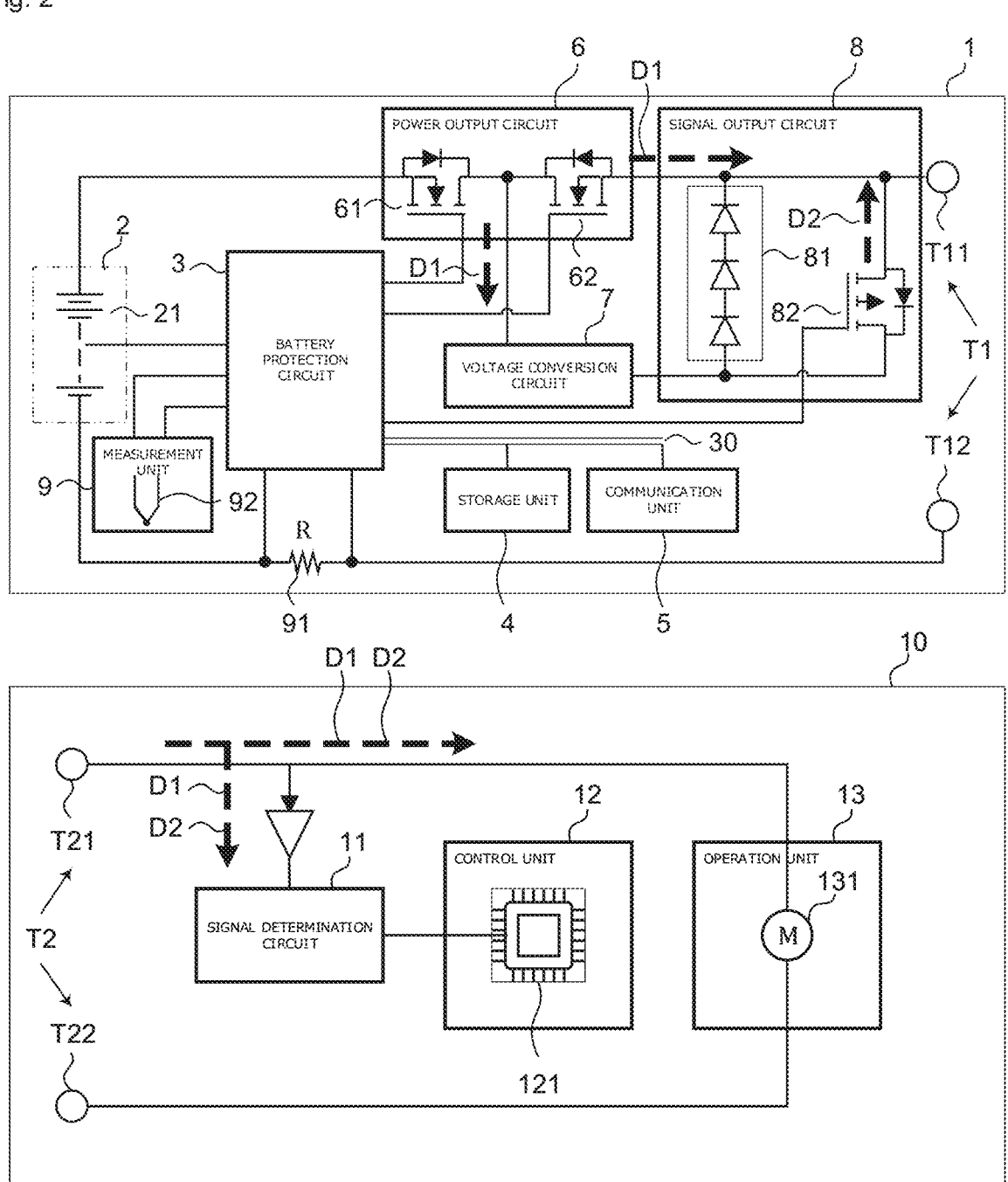
FIG. 2 is a circuit view of the battery pack 1 and the device 10.

FIG. 2 is a circuit view of the battery pack 1 and the device 10. The battery pack 1 comprises a power supply unit 2, a battery protection circuit 3, a storage unit 4, a communication unit 5, a power output circuit 6, a voltage conversion circuit 7, a signal output circuit 8, and a measurement unit 9. Hereinafter, these components will be described in detail.

1.1.1 Power Supply Unit 2

The power supply unit 2 is a power supply source of the battery pack 1. The power supply unit 2 can be composed of, for example, a secondary battery 21. The secondary battery 21 is a battery (rechargeable battery) that can be repeatedly charged/discharged and is configured to supply power to the battery pack 1.

The first connection terminal T1 of the battery pack 1 has a first positive side connection terminal T11 and a first negative side connection terminal T12. When the battery pack 1 is charged, a positive side connection terminal (not shown) of the charger is connected to the first positive side connection terminal T11, and a negative side connection terminal (not shown) of the charger is connected to the first negative side connection terminal T12. Then, the battery pack 1 is charged with power from an external power source.

The second connection terminal T2 of the device 10 has a second positive side connection terminal T21 and a second negative side connection terminal T22. When the battery pack 1 is discharged, the second positive side connection terminal T21 is connected to the first positive side connection terminal T11, and the second negative side connection terminal T22 is connected to the first negative side connection terminal T12. Then, the first power D1 and the second power D2 are discharged from the battery pack 1 to the device 10.

The secondary battery 21 is, for example, a lead storage battery, an alkaline storage battery, a nickel cadmium battery, a nickel hydrogen battery, and a lithium-ion battery, but the type are not limited. Further, the number of secondary batteries 21 of the power supply unit 2 may be one or a plurality, the quantity is not limited.

1.1.2 Battery Protection Circuit 3

The battery protection circuit 3 protects the battery pack 1 and the device 10 when the battery pack 1 is in an abnormal operation status. The battery protection circuit 3 is connected to the power supply unit 2, the power output circuit 6, the signal output circuit 8, and the measurement unit 9. The battery protection circuit 3 controls the power output circuit 6 and the signal output circuit 8. The operation power of the battery protection circuit 3 is supplied from the power supply unit 2.

Figure 3:
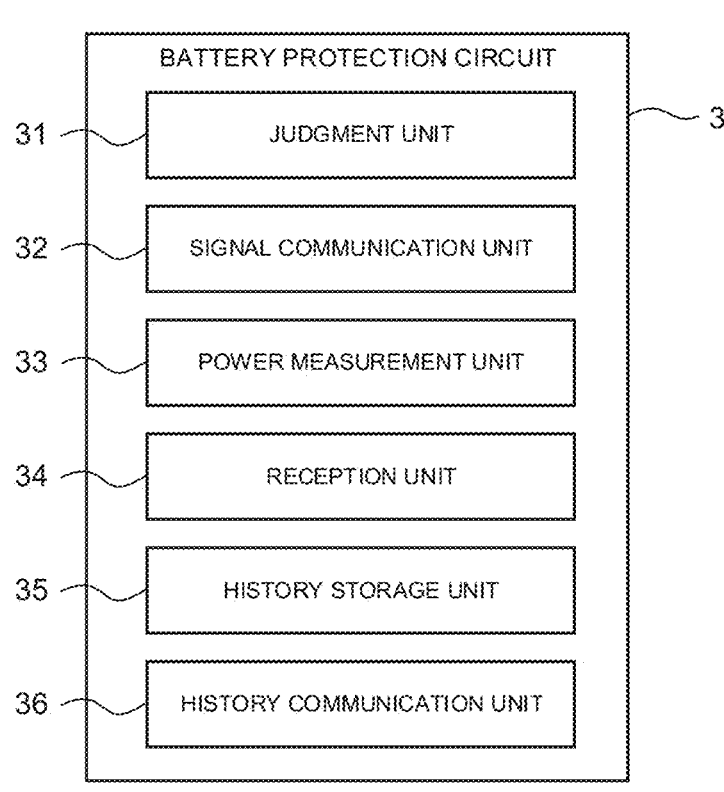
FIG. 3 is a functional block view showing functions of a battery protection circuit 3.

The battery protection circuit 3 processes or controls the overall operation related to the battery pack 1. The battery protection circuit 3 includes, for example, a central processing unit (CPU) (not shown). FIG. 3 is a functional block view showing functions of a battery protection circuit 3. The battery protection circuit 3 realizes various functions related to the battery pack 1 by reading a predetermined program stored in the storage unit 4. Specifically, it corresponds to a judgment function, a signal communication function, a power measurement function, a reception function, a history storage function, and a history communication function. That is, the information processing by the software (stored in the storage unit 4) is concretely realized by the hardware (battery protection circuit 3), so as to be executed as a judgment unit 31, a signal communication unit 32, a power measurement unit 33, a reception unit 34, a history storage unit 35, and a history communication unit 36.

(Judgment 31)

The judgment unit 31 is configured to judge whether an abnormality of the operation status of the battery pack 1 has occurred or not. Further, the determination unit 31 is configured to judge a type of abnormality of the operation status. Here, the types of abnormalities of the operation status include, for example, an overcharged status, an over discharged status, abnormalities in voltage values and current values that occurred when the battery pack 1 is charged/discharged, and an abnormality in the heat generated from an electronic device in the battery pack 1. The types of abnormalities are not specified by these, and are all events corresponding to abnormalities in the operation status of the battery pack 1. For example, the judgment unit 31 acquires data such as voltage values, current values, and temperature of the electric device of the battery pack 1 and compares the data with the threshold value stored in the storage unit 4 in advance to judge whether an abnormality has occurred or not.

The judgment unit 31 is configured to judge the type of abnormality of the operation status based on a first voltage value V1 of the first power D1 or a current value measured by the power measurement unit 33 described later. For example, the judge unit 31 may acquire data of the voltage value and the current value of the battery pack 1 and judge the type of abnormality of the operation status based on the acquired data.

Further, the judgment unit 31 is configured to judge the type of abnormality of the operation status based on an output value of a measurement device 92 received by the reception unit 34 described later. For example, the judgment unit 31 may acquire data such as temperature of the electronic device mounted on the battery pack 1 and judge the type of abnormality of the operation status based on the acquired data.

(Information Communication Unit 32)

The information communication unit 32 signals the type of abnormality when the operation status of the battery pack 1 judged to be abnormal. Since the signal is a digital electric signal, it is converted into an analog electric signal by a digital-to-analog conversion circuit (not shown) and transmitted to the signal output circuit 8. For example, in the case of voltage abnormality, the electric signal repeats on and off once. In the case of abnormal temperature of electronic equipment, the electric signal repeats on and off twice. In this way, the signal communication unit 32 signals so that the type of abnormality of the operation status can be identified. Upon signalization, the signal communication unit 32 may identify the electric signal by changing the time for turning it on or off.

(Power Measurement Unit 33)

The power measurement unit 33 is configured to measure the first power D1 output from the power supply unit 2. The power measurement unit 33 measures the voltage value or the current value of the first power D1. Specifically, the power measurement unit 33 measures the voltage across a resistor 91 as a load, and the current of the first power D1 by dividing the voltage by the value of the register 91. The voltage value is also measured by an analog-to-digital converter (not shown). Since the current value and the voltage value are analog electric signals, they are converted into digital electric signals by an analog-digital circuit (not shown).

Further, the power measurement unit 33 may measure the power value of the first power D1. A power measurement circuit is provided in the battery pack 1 to measure the power value. Since such a power value is an analog electric signal, it is converted into a digital electric signal by an analog-to-digital converter (not shown). Measuring the power value not only detects an abnormality of the operation status of the battery pack 1, but also grasps the remaining amount when the power supply unit 2 is the secondary battery 21.

(Reception Unit 34)

The reception unit 34 is configured to receive the output value of the measurement device 92. When the output value of the measurement device 92 is an analog electric signal of a voltage value or a current value, the output data is converted into a digital electric signal by an analog-to-digital converter (not shown). The reception unit 34 receives the output data converted into a digital electric signal. The measurement device 92 may be provided not only inside but outside the battery pack 1.

(History Storage Unit 35)

When the judgment unit 31 judges that an abnormality has occurred, the history storage unit 35 is configured to store the time when an abnormality is judged to be occurred and the operation status at the time when the abnormality occurs as history. In other words, the history storage unit 35 stores the time when the abnormality is judged and the type of abnormality of the operation status in the storage unit 4.

Besides the abnormality of the operation status, the history storage unit 35 may also store the remaining amount of the secondary battery 21 in the storage unit 4 as a history. Specifically, the power measurement unit 33 measures the remaining amount of the secondary battery 21 at a predetermined interval and stores the measured time and the remaining amount in the storage unit 4. In this way, by storing the history of the remaining amount of the secondary battery 21, it is possible to grasp the information such as the time required to complete the charging and the charging rate, and to grasp the aging status of the secondary battery 21. In this way, the user can grasp the timing of replacement of the secondary battery in advance.

(History Communication Unit 36)

The history communication unit 36 send transmits data and the like related to the history stored by the history storage unit 35 to the communication unit 5 described later. The timing of transmission may be each time the history storage unit 35 stores the operation status as a history or may be at a predetermined interval.

1.1.3 Storage Unit 4

The storage unit 4 stores various information defined by the above description. The storage unit 4 is a storage device such as a solid status drive (SSD), or a random access memory (RAM) that stores temporarily necessary information (arguments, arrays, or the like) related to program operations and the like can be implemented as a memory. Moreover, combinations thereof may be used. Specifically, when the judgment unit 31 judges that an abnormality has occurred in the battery pack 1, the storage unit 4 stores the time when the abnormality is judged and the operation status at the time when the abnormality occurs. Further, the storage unit 4 stores a judgment program, a signal communication program, a power measurement program, a reception program, a history storage program, and a history communication program. Furthermore, the storage unit 4 stores various programs related to the battery protection circuit 3 executed by the battery protection circuit 3.

1.1.4 Communication Unit 5

Although a wired communication means such as USB, IEEE1394, Thunderbolt, wired LAN network communication is preferable for the communication unit 5, wireless communication means such as wireless LAN network communication, mobile communication such as LTE/3G, Bluetooth (registered trademark) communication and the like may be included if necessary. That is, it is more preferable to carry out as a set of these communication means. In particular, it is preferable that the battery protection circuit 3, the storage unit 4, and the information processing device 20 outside are configured to be communicable according to a predetermined communication standard.

When the judgment unit 31 judges that an abnormality has occurred in the battery pack 1, the communication unit 5 transmits the time when the abnormality is judged and the operation status at the time when the abnormality occurs to the information processing device 20. Further, data such as programs and parameters related to the operation of the battery pack 1 can be communicated with the information processing device 20 through a telecommunication line.

1.1.5 Power Output Circuit 6

The power output circuit 6 includes a CFET 61 (Charge Field Effect Transistor) and a DFET 62 (Discharge Field Effect Transistor), and switches the charge/discharge of the battery pack 1. The power output circuit 6 is connected to the power supply unit 2 and the signal output circuit 8. Further, when an abnormality occurs in the battery pack 1, the power output circuit 6 is connected to the voltage conversion circuit 7 so as to output the second power D2 to the device 10.

When the battery pack 1 is charged/discharged, the CFET 61 and the DFET 62 are combined to control the power output circuit 6 so that a current does not flow in the opposite direction. Specifically, the DFET 62 cuts off the current in the discharge direction of the battery pack 1, and the CFET 61 cuts off the current in the charge direction of the battery pack 1.

A current flows from an external charger between the source and drain of the DFET 62. When the battery pack 1 is being charged, a voltage is applied to the gate side of the CFET 61 from the battery protection circuit 3, so that the current further passes between the source and the drain of the CFET 61 and flows to the secondary battery 21. In this way, the battery pack 1 is charged.

A current flows from the secondary battery 21 between the source and the drain of the CFET 61. When the battery pack 1 is discharged, a voltage is applied to the gate side of the DFET 62 from the battery protection circuit 3, so that the current further passes between the source and the drain of the DFET 62 and flows to the device 10. In this way, the battery pack 1 is discharged.

When the first connection terminal T1 of the battery pack 1 and the second connection terminal T2 of the device 10 are connected, power is input to the power output circuit 6 from the secondary battery 21. When the operation status of the battery pack 1 is normal, the power output circuit 6 is configured to output the first power D1. Here, the first power D1 is power for operating the device 10. On the other hand, when the operation status of the battery pack 1 is abnormal, the power output circuit 6 is configured to output the second power D2. Here, the second power D2 is power having a magnitude that the device 10 does not operate.

When the operation status of the battery pack 1 is normal, the current of the first power D1 passes between the source and the drain of the DFET 62 while the voltage is applied from the battery protection circuit 3 to the gate side of the DFET 62, then flows to the device 10 through the signal output circuit 8 and the first connection terminal T1. Although the current of the first power D1 flows to the first connection terminal T1 through the signal output circuit 8 as shown in FIG. 2, but the current does not have to pass through the signal output circuit 8.

On the other hand, when the operation status of the battery pack 1 is abnormal, no voltage is applied to the gate side of the DFET 62 from the battery protection circuit 3. Therefore, the current of the first power D1 does not flow between the source and the drain of the DFET 62 but flows to the voltage conversion circuit 7. When the operation status of the battery pack 1 is abnormal in this way, the first power D1 is input to the power output circuit 6.

1.1.6 Voltage Conversion Circuit 7

The voltage conversion circuit 7 is connected to the power output circuit 6 and the signal output circuit 8 and converts the first voltage value V1 of the first power D1 input from the power output circuit 6 into the second voltage value V2. The voltage conversion circuit 7 outputs the second power D2 converted to the second voltage value V2 to the signal output circuit 8. The magnitude of the second voltage value V2 is smaller than that of the first voltage value V1. The value of (second voltage value V2/first voltage value V1) is greater than 0 and smaller than 1.

Specifically, the value of (second voltage value V2/first voltage value V1) is 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, and may be within the range between any two of the numerical values exemplified here.

1.1.7 Signal Output Circuit 8

The signal output circuit 8 is connected to the voltage conversion circuit 7 and the first connection terminal T1 and includes a diode 81 and a FET 82 (Field Effect Transistor). The signal output circuit 8 is configured to fluctuate the second voltage value V2 of the second power D2 input from the voltage conversion circuit 7 based on the type of abnormality of the operation status of the battery pack 1 judged by the judgment unit 31. Specifically, the electric signal sent from the signal communication unit 32 controls the FET 82 and fluctuates the second voltage of the second power D2. In this way, the signal output circuit 8 transmits an electric signal indicating the type of abnormality of the operation status of the battery pack 1 or the like to the device 10.

Further, the signal output circuit 8 is configured to fluctuate the second voltage value V2 when the remaining amount of the secondary battery 21 is equal to or less than a predetermined threshold value. By transmitting an electric signal indicating a status in which the remaining amount of the secondary battery 21 is reduced to the device 10, the device 10 can operate according to the remaining amount of the secondary battery 21.

Figure 4:
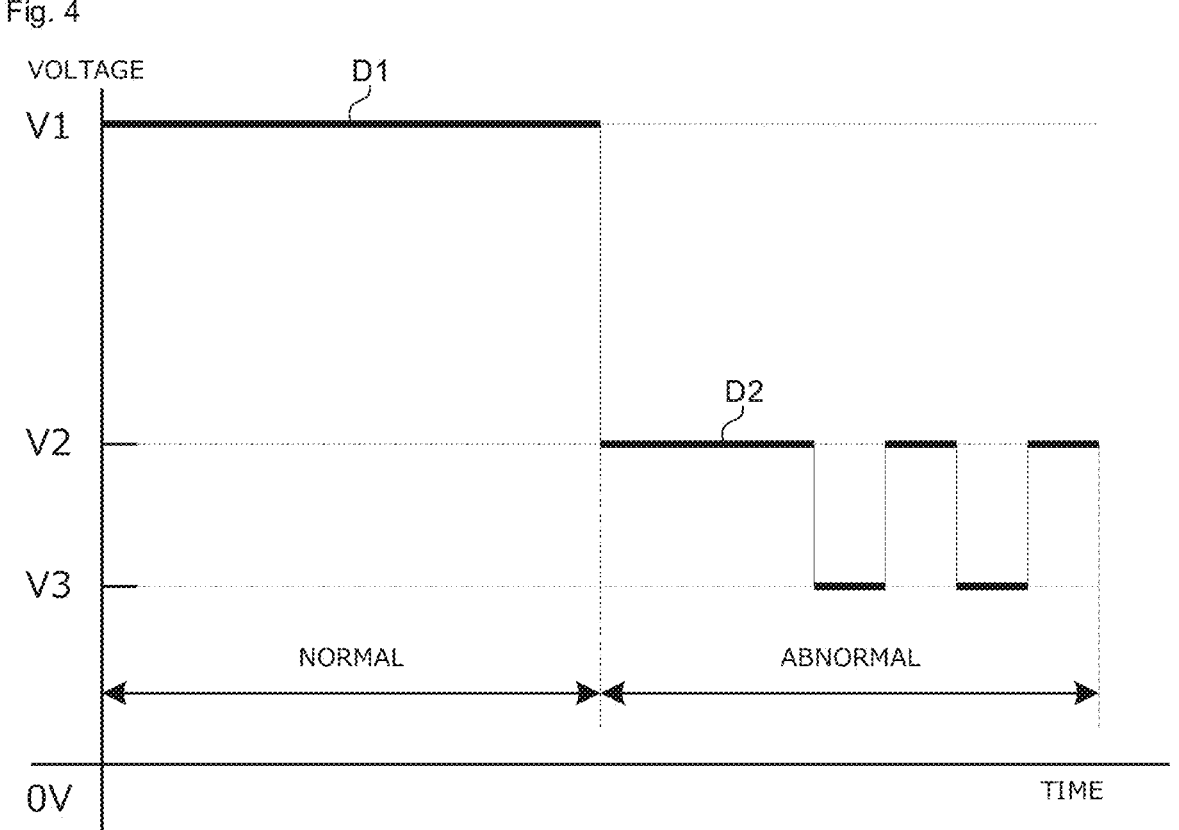
FIG. 4 is a status view of voltage values of a first power D1 and a second power D2 output from the battery pack 1.

FIG. 4 is a status view of voltage values of a first power D1 and a second power D2 output from the battery pack 1. When the operation status of the battery pack 1 is normal, the first power D1 input from the power output circuit 6 is signalized by the signal output circuit 8 and output to the first connection terminal T1. The voltage of the first power D1 is the first voltage value V1. On the other hand, when the operation status of the battery pack 1 is judged to be abnormal, the first power D1 input from the power output circuit 6 is converted into the second power D2 by the voltage conversion circuit 7. Then, the second power D2 is signalized by the signal output circuit 8 and output to the first connection terminal T1. As shown in FIG. 4, the voltage of the second power D2 fluctuates between the second voltage value V2 and the third voltage value V3. Here, the value of the third voltage value V3 may be greater than the second voltage value V2.

Specifically, the second power D2 input from the voltage conversion circuit 7 is input to the source of the FET 82, and the current of the second power D2 between the source and the drain of the FET 82 depends on the voltage (gate voltage) applied to the gate of the FET 82 is controlled. Since the voltage of the electric signal transmitted from the signal communication unit 32 is applied to the gate side of the FET 82, when the electric signal is on, the voltage of the second power D2 between the source and the drain of the FET 82 becomes the second voltage value V2. On the other hand, when the electric signal is off, no current flows between the source and the drain of the FET 82, and a current flows through the diode 81. Since the voltage drop occurs due to the diode 81, the voltage of the second power D2 becomes the third voltage value V3. The signal output circuit 8 may lower the third voltage value V3 until it approaches zero. It should be noted that the diode 81 is not limited as long as it has a voltage drop function.

In the example of FIG. 4, the voltage of the second power D2 input to the signal output circuit 8 is output as L/H signals with the second voltage value V2 being High and the third voltage value V3 being Low. The absolute value of (third voltage value V3/second voltage value V2) is preferably 0 to 10. Since the third voltage value V3 may be 0 as the lower limit value, the absolute value of (third voltage value V3/second voltage value V2) includes 0. Further, since the case that the values of V3 and V2 are equal is also included, the absolute value of (third voltage value V3/second voltage value V2) includes 1.

Specifically, the value of (third voltage value V3/second voltage value V2) is 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 2, 3, 4, 5, 6, 7, 8, 9, 10, and may be within the range between any two of the numerical values exemplified here.

The signal output circuit 8 may fluctuate the second voltage value V2 to a voltage value greater than 2. By increasing the quantization in more than two steps, the amount of data transmitted to the device 10 increases. Then, the battery pack 1 can transmit more types of abnormality of operation status.

1.1.8 Measurement Unit 9

The measurement unit 9 comprises a measurement device 92. The measurement unit 9 is connected to the battery protection circuit 3, and a physical quantity measured by the measurement device 92 is output to the battery protection circuit 3.

The measurement device 92 measures at least one of temperature, humidity, barometric pressure, and acceleration. It is useful to measure the acceleration because the electrical circuit may be damaged if the battery pack 1 is impacted from the outside. It should be noted that the physical quantity measured by the measurement device 92 is not limited as long as it can grasp the operation status of the battery pack 1. The measurement unit 9 may have a plurality of measurement devices 92 for each physical quantity to be measured, or may have a measurement device 92 capable of simultaneously measuring a plurality of physical quantities.

The measurement device 92 includes a sensor, and the sensor measures a value obtained by converting a physical quantity into an electric signal. For instance, the measurement device 92 for measuring temperature includes sensors for thermocouples, resistance temperature detectors, thermistors, semiconductors, and crystal oscillators. Such sensors are not limited to these as long as they can convert temperature into electrical signals.

1.2 Device 10

The device 10 connected to the battery pack 1 will be described in this section. The first connection terminal T1 of the battery pack 1 is connected to the second connection terminal T2 of the device 10, and the first power D1 and the second power D2 are supplied from the battery pack 1 to the device 10. The use of the device 10 is not limited as long as it can be connected to the battery pack 1. For instance, the device 10 may be a hand-held work machine such as a chainsaw, a brush cutter, a hedge trimmer, or a blower, and may be a cutting machine such as a circular saw or a band saw, or an industrial machine product such as a floodlight or a generator. The device 10 includes a signal determination circuit 11, a control unit 12, and an operation unit 13. Hereinafter, each component will be further described.

1.2.1 Signal Determination Circuit 11

The signal determination circuit 11 comprises an analog-to-digital converter (not shown). The signal determination circuit 11 converts the analog electric signals of the first power D1 and the second power D2 input from the battery pack 1 into digital electric signals. The digitized electric signals are output to the control unit 12.

1.2.2 Control Unit 12

The control unit 12 identifies the fluctuation value of the second voltage value V2 of the second power D2 input from the battery pack 1. Then, the control unit 12 is configured to control the device 10 by the second power D2 based on the identified fluctuation value. The control unit 12 includes a CPU 121. Specifically, the CPU 121 controls the electronic device and the power device in the device 10 based on the electric signal input from the signal determination circuit 11.

The CPU 121 specifies the type of abnormality of the operation status of the battery pack 1 based on the change of the electric signal and controls the electronic device and the power device in the device 10. For example, when an abnormality of the operation status of the battery pack 1 occurs, the CPU 121 identifies the abnormality from the transmitted electric signal and stops the operation of the operation unit 13 described later. The control unit 12 may include an analog controller instead of the CPU 121 to analog-controls the electronic device and the power device in the device 10.

1.2.3 Operation Unit 13

Operation unit 13 comprises a motor 131, which is a power device. At least the first electric power D1 is input to the operation unit 13. Then, the operation unit 13 is configured to be operable by the input first power D1. On the other hand, since the magnitude of the second power D2 is equal to or less than the power value for operating the operation unit 13, the motor 131 does not operate when the second power D2 is input to the operation unit 13.

1.3 Information Processing Device 20

The information processing device 20 will be described in this section. The information processing device 20 is configured to communicate with the battery pack 1 according to a predetermined communication standard. The information processing device 20 can acquire data related to the abnormality of the operation status of the battery pack 1 and the type of abnormality from the communication unit 5 in real time. Therefore, the operating status of a plurality of battery packs 1 can be quickly grasped, respectively. Such data is also useful for maintenance and repair.

2. Operation Status Transmission Method

In chapter 2, the operation status transmission method of the battery pack 1 described in chapter 1 will be illustrated. The operation status transmission method of the battery pack 1 that supplies power to the device 10 to be connected includes a power output step. In the power output step, when the operation status of the battery pack 1 is normal, the first power D1 is output. When the operation status of the battery pack 1 is abnormal, the second power D2 is output. The first power D1 is power for operating the device 10, and the second power D2 is power having a magnitude that the device 10 does not operate. As a result, the operation status of the battery pack 1 is transmitted to the device 10. Hereinafter, the operation status transmission method will be described in detail.

Figure 5:
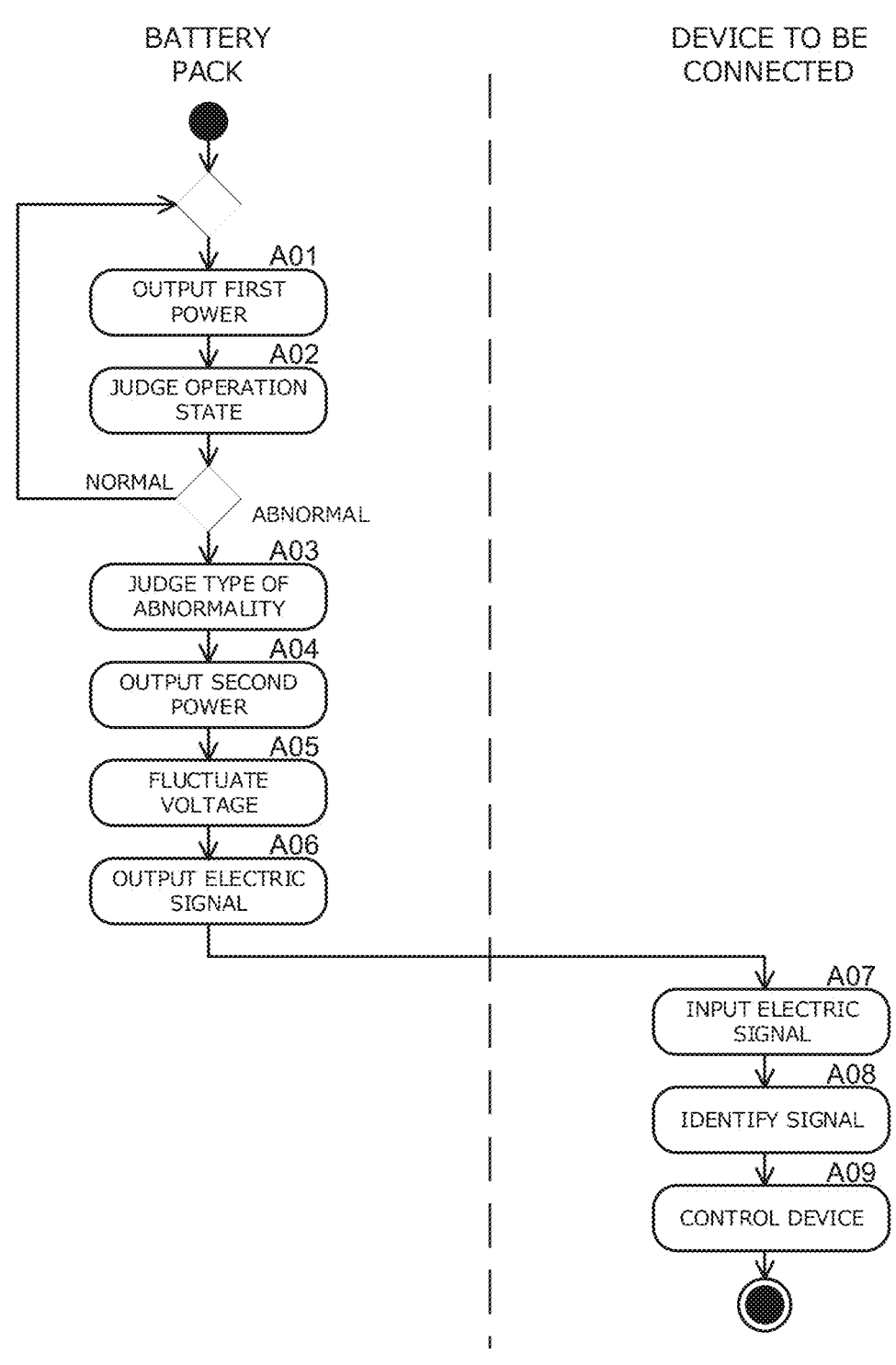
FIG. 5 is an activity view of an operation status transmission method from the battery pack 1 to the device 10 according to an embodiment of the present invention.

FIG. 5 is an activity view of the operation status transmission method from the battery pack 1 to the device 10 according to an embodiment of the present invention. Hereinafter, description will be given with reference to FIG. 5.

[Start]

(Activity A01)

The battery pack 1 outputs the first power D1 that operates the motor 131 of the device 10 to be connected.

(Activity A02)

The judgment unit 31 judges whether the operation status of the battery pack 1 is normal or not. If the operation status is normal, activity A01 is executed. If the operation status is abnormal, activity A03 is executed.

(Activity A03)

The judgment unit 31 judges the type of abnormality of the operation status of the battery pack 1.

(Activity A04)

The voltage conversion circuit 7 converts the first voltage value V1 of the first power D1 into the second voltage value V2 and outputs it as the second power D2.

(Activity A05)

The signal output circuit 8 fluctuates the second voltage value V2 of the second power D2 between the second voltage value V2 and the third voltage value V3 based on the type of abnormality of the operation status.

(Activity A06)

The signal output circuit 8 outputs the second voltage value V2 of the fluctuated second power D2 as an electric signal.

(Activity A07)

An electric signal of the abnormality of the operation status of the battery pack 1 is input to the signal determination circuit 11 of the device 10.

(Activity A08)

The CPU 121 of the control unit 12 determines the type of abnormality of the operation status from the digitized abnormal signal of the operation status.

(Activity A09)

The CPU 121 of the control unit 12 controls the electronic device in the device 10. Then, when the second power D2 is input to the operation unit 13, the motor 131 of the operation unit 13 may be stopped. Further, the type of abnormality of the operation status may be indicated on the display (not shown) of the device 10 or the information processing device 20.

[End]

As shown in FIG. 5, compare to the method in which electric signals are superimposed and transmitted to a power line that supplies power from the battery pack 1 to the device 10, the method of transmitting the presence/absence of an abnormality or the type of abnormality of the operation status of the battery pack 1 to the device 10 to be connected does not need to consider the compatibility between the battery pack 1 and the device 10. In the method of transmitting electric signals by superimposing them, a fibrous design considering impedance is required in designing the circuit of the device 10 because the supplied power and the transmitted electric signal must be separated in the device 10. Further, a signal modulation circuit or the like is required, and the circuit configuration of the device 10 becomes complicated and easily affected by external noise or the like. Therefore, since the device 10 may not fit even with the same model of the battery pack 1, the device 10 is not suitable for the battery pack 1 which is unspecified and has various types.

According to the present embodiment, since it is unnecessary to separately provide a terminal dedicated to communication in the method of transmitting the presence/absence of abnormality or the type of abnormality of the operation status of the battery pack 1 to the device 10 to be connected via the power line for supplying power, the terminal configuration is simplified. Therefore, the battery pack 1 can be miniaturized at low cost. Further, it becomes easy to make a waterproof and dustproof structure because the number of terminals is small.

The battery pack 1 does not output the first voltage value V1 that operates the operation unit 13 while transmitting the presence/absence of an abnormality of the operation status or the type of abnormality to the device 10 to be connected. Therefore, the operation unit 13 can be stopped before the control unit 12 of the device 10 detects an abnormality of the operation status of the battery pack 1.

3. Others

The embodiment described above may be implemented as follows.

(1) The history storage unit 35 may store the model number of the battery pack 1 in the storage unit 4 in addition to the time and the operation status in which the abnormality of the operation status of the battery pack 1 occurs. As a result, the operation status of the battery pack 1 can be grasped in detail individually, which is advantageous in quality assurance.

(2) The history storage unit 35 may further store the number of times the battery pack 1 and the device 10 are connected in the storage unit 4. It is advantageous for the user of the battery pack 1 to predict when to replace the deteriorated battery pack 1.

(3) The measurement device 92 of the measurement unit 9 may be outside the battery pack 1. By understanding the usage environment of the battery pack 1, the battery pack 1 can be used more safely. Furthermore, since the charging environment can be grasped, it is possible to charge the battery pack 1 with power more safely.

(4) The device 10 may include a storage unit. Here, when the CPU 121 of the control unit 12 receives an electric signal indicating an abnormality of the operation status of the battery pack 1, the time when the abnormality occurs and the operation status at the time when the abnormality occurs are stored in the storage unit as a history. The stored data is useful for the manufacturer, distributor, manager, or the like of the device 10 to analyze the quality of the device 10.

(5) The voltage conversion circuit 7 may control the second voltage value V2 according to the remaining amount of the secondary battery 21. The signal output circuit 8 fluctuates the second voltage value V2 where the voltage value has dropped, so that even when the remaining amount of the secondary battery 21 is low, the presence/absence of an abnormality or the type of abnormality of the operation status of the battery pack 1 can be transmitted to the device 10 to be connected.

Further, the present invention may be provided by each of the following embodiments.

The battery pack further comprises a judgment unit configured to judge a type of abnormality of the operation status, and a signal output circuit configured to fluctuate a second voltage value of the second power based on the judged type of abnormality.

The battery pack further comprises a power measurement unit configured to measure the first power, wherein the judgment unit is configured to judge a type of abnormality of the operation status based on a voltage value or a current value of the first power measured by the power measurement unit.

The battery pack further comprises a reception unit configured to receive an output value of a measurement device, wherein the judgment unit is configured to judge a type of abnormality of the operation status based on the output value received by the reception unit.

The battery pack further comprises a history storing unit, wherein: the judgment unit is configured to judge whether an abnormality of an operation status of the battery pack 1 has occurred or not, and when the judgment unit judges that the abnormality has occurred, the history storing unit stores the operation status at the time when the abnormality is judged to occur and the operation status at the time when the abnormality occurs as a history.

The battery pack further comprises a secondary battery configured to supply power to the battery pack, wherein: the signal output circuit is configured to allow the second voltage value to fluctuate when a remaining amount of the secondary battery is equal to or less than a predetermined threshold value.

A system, comprising a battery pack of claim 1 and the device, wherein: the first power and the second power are supplied to the device through a first connection terminal of the battery pack and a second connection terminal of the device, and the device is configured to operate based on the first power and to be controlled based on the second power.

In the system, the device further comprises: a control unit configured to identify a fluctuation value of the second voltage value of the second power, and to control the device by the second power based on the identified fluctuation value, and an operation unit configured that at least the first power is input and to operate by the input first power.

In the system, the device is an industrial machine product.

An operation status transmission method of a battery pack that supplies power to a device to be connected, comprising: a power output step to output a first power when an operation status of the battery pack is normal, and to output a second power when an operation status of the battery pack is abnormal, wherein: the first power is power for operating the device, and the second power is power of a magnitude that the device does not operate, as a result, an operation status of the battery pack is transmitted to the device.

A program that makes a computer to function as a control unit that controls a power output circuit, wherein: the control unit is configured to control the power output circuit so as to output a first power when an operation status of a battery pack that supplies power to a device to be connected is normal, and controls the power output circuit so as to output a second power when an operation status of the battery pack is abnormal, wherein: the first power is power for operating the device, and the second power is power of a magnitude that the device does not operate.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

13

The invention claimed is:

1. A battery pack comprising:

a power output circuit configured to supply first and second power to a device connected to the battery pack, the device being a hand-held work machine, a cutting machine, or an industrial machine product;

a voltage conversion circuit configured to convert the first power into the second power;

a memory configured to store a program; and a processor configured to execute the program so as to:

determine an operation status of the battery pack;

cause the power output circuit to output the first power to the device when the processor determines that the operation status of the battery pack is normal; and cause the voltage conversion circuit to convert the first power into the second power to provide the second power to the device when the processor determines that the operation status of the battery pack is abnormal, wherein the first power has a first voltage value and is for operating the device, the second power has a second voltage value that is smaller than the first voltage value, and the second power has a magnitude that is outside of a range which the device requires to operate such that the device is disabled from operating when the second power is provided thereto, an electrical signal indicating a type of abnormality of the operation status of the battery pack is provided to the device by using the second voltage value of the second power, the battery pack further comprises a signal output circuit configured to provide the electrical signal in which the second voltage value of the second power is fluctuated, wherein the processor is further configured to judge the type of abnormality of the operation status, and the signal output circuit is configured to fluctuate the second voltage value of the second power based on the judged type of abnormality to provide the electrical signal to the device.

2. The battery pack of claim 1, wherein the processor is further configured to:

measure the first voltage value or a current value of the first power; and judge the type of abnormality of the operation status based on the measured first voltage value or the measured current value of the first power.

3. The battery pack of claim 1, wherein the processor is further configured to:

receive an output value of a measurement device; and judge the type of abnormality of the operation status based on the received output value.

4. The battery pack of claim 1, wherein the processor is further configured to judge whether an abnormality of the operation status of the battery pack occurs, and when the processor judges that the abnormality has occurred, the memory is configured to store a time and the operation status at the time the abnormality has occurred as a history.

5. The battery pack of claim 1, further comprising:

a secondary battery configured to supply power to the battery pack, wherein the signal output circuit is configured to fluctuate the second voltage value of the second power when a remaining amount of the secondary battery is equal to or less than a predetermined threshold value.

14

6. A system comprising:

the device; and the battery pack according to claim 1, wherein the first power and the second power are supplied to the device through a first connection terminal of the battery pack and a second connection terminal of the device, and the device is configured to operate based on the first power and to be controlled based on the second power.

7. The system of claim 6, wherein the device further includes:

a device processor configured to identify a fluctuation value of the second voltage value of the second power, and to control the device by the second power based on the identified fluctuation value; and a motor configured to receive at least the first power and to operate by the first power.

8. The system of claim 6, wherein the device is the industrial machine product.

9. An operation status transmission method of a battery pack for causing a processor to execute a program stored in a memory, the operation status transmission method comprising executing on the processor the steps of:

determining an operation status of the battery pack;

outputting a first power from the battery pack to a device that is configured to be connected to the battery pack when the processor determines that the operation status of the battery pack is normal, the device being a hand-held work machine, a cutting machine, or an industrial machine product;

converting the first power from the battery pack into a second power to provide the second power to the device when the processor determines that the operation status of the battery pack is abnormal;

transmitting an electrical signal indicating a type of abnormality of the operation status of the battery pack to the device by using a second voltage value of the second power; and judging the type of abnormality of the operation status, wherein the first power has a first voltage value and is for operating the device, the second power has the second voltage value that is smaller than the first voltage value, and the second power has a magnitude that is outside of a range which the device requires to operate such that the device is disabled from operating when the second power is provided thereto, and the second voltage value of the second power is fluctuated based on the judged type of abnormality to provide the electrical signal to the device.

10. A non-transitory computer readable medium storing a program for causing a computer to execute a process by a processor so as to perform the steps of:

determining an operation status of a battery pack;

outputting a first power from the battery pack to a device that is configured to be connected to the battery pack when the processor determines that the operation status of the battery pack is normal, the device being a hand-held work machine, a cutting machine, or an industrial machine product;

converting the first power from the battery pack into a second power to provide the second power to the device when the processor determines that the operation status of the battery pack is abnormal;

transmitting an electrical signal indicating a type of abnormality of the operation status of the battery pack to the device by using a second voltage value of the second power; and judging the type of abnormality of the operation status, wherein the first power has a first voltage value and is for operating the device, the second power has the second voltage value that is smaller than the first voltage value, and the second power has a magnitude that is outside of a range which the device requires to operate such that the device is disabled from operating when the second power is provided thereto, and the second voltage value of the second power is fluctuated based on the judged type of abnormality to provide the electrical signal to the device.

* * * * *